United States Patent [19]

Binks

[11] 4,320,699
[45] Mar. 23, 1982

[54] FLEXIBLE SEPARABLE, NON-STICK LINERS FOR HEATED COOKING SURFACES

[75] Inventor: Chester J. Binks, LaGrange, Ill.

[73] Assignee: Solar-Kist Corporation, LaGrange, Ill.

[21] Appl. No.: 899,702

[22] Filed: Apr. 24, 1978

[51] Int. Cl.³ .............................................. A47J 37/10
[52] U.S. Cl. .......................................... 99/349; 99/422; 99/425; 99/376; 126/390; 220/403; 220/410; 426/523; 428/174
[58] Field of Search ................. 99/422, 347, 403, 411, 99/444, 446, 425, 349, 372, 376; 220/403, 408, 405, 406, 404, 410, 449, 458; 229/3.5 MF, 53; 426/412–413, 410, 411, 523; 4/172; 156/212; 264/321, 51, 338; 428/174, 180, 198, 203, 412, 421, 422, 483, 500, 522, 537; 126/390

[56] References Cited

U.S. PATENT DOCUMENTS

| | | | |
|---|---|---|---|
| 1,608,901 | 11/1926 | Miller | 99/446 X |
| 2,174,425 | 9/1939 | Schlumbohm | 229/3.5 MF X |
| 2,939,606 | 6/1960 | Durbin | 229/3.5 MF |
| 3,024,114 | 3/1962 | McConville | 426/523 |
| 3,155,304 | 11/1964 | Beerend | 229/3.1 |
| 3,313,230 | 4/1967 | Simjian | 126/390 X |
| 3,322,113 | 5/1967 | Simjian | 99/422 X |
| 3,427,955 | 2/1969 | Menzin | 99/444 X |
| 3,578,239 | 5/1971 | Periman | 229/53 |
| 3,713,380 | 1/1973 | Bardin | 99/422 |
| 3,724,711 | 4/1973 | George | 220/408 |
| 3,757,990 | 9/1973 | Buth | 220/404 |
| 3,779,447 | 12/1973 | Bemiss | 220/403 |
| 3,934,748 | 1/1976 | Racz | 220/408 |
| 3,949,135 | 4/1976 | Vercauteren | 428/422 X |
| 3,997,677 | 12/1976 | Hirsch et al. | 426/412 X |
| 4,141,771 | 2/1979 | Barker et al. | 428/483 X |

Primary Examiner—Billy J. Wilhite
Attorney, Agent, or Firm—Hill, Van Santen, Steadman, Chiara & Simpson

[57] ABSTRACT

A flexible non-stick liner of thin plastic sheet material such as tetrafluoroethylene polymers is arranged to rest in readily removable covering relation on a heated cooking surface, keeping the cooking surface substantially clean. The liner can be easily removed and replaced, stays substantially clean, can be wiped clean if desired. It is especially suitable for omelet pans, facilitating the rolling and sealing of cooked omelets. The liner is also suitable for flat surface grills, cooking plates, fry pans, deep-fat cooking vessels, stew pots, baking pans and tins, sauce pans, skillets, roasting pans, pressure cookers, and the like.

11 Claims, 14 Drawing Figures

FLEXIBLE SEPARABLE, NON-STICK LINERS FOR HEATED COOKING SURFACES

This invention relates to the art of cooking, and is more particularly concerned with the lining of heated cooking surfaces.

A major problem related to untreated, unprotected, heated cooking surfaces has been that of waste due to adherence of cooking materials to the cooking surfaces, as well as the consequent difficulties involved in maintaining cleanliness and proper sanitation. Various attempts to solve the problem have been proposed. For example as represented by U.S. Pat. No. 3,155,304 a treated disposable paper insert is suggested for baking pans. U.S. Pat. No. 2,939,606 suggest the use of aluminum foil insert but in order to secure adherence of the foil to the utensil requires a suction system. U.S. Pat. No. 3,724,711 provides a formed aluminum insert and reqires air venting structure. U.S. Pat. No. 3,934,748 provides a replaceable insert requiring a special retaining structure for the utensil. Characteristic of all of the devices in the noted patents is that the inserts require special forming. Where non-stick coatings are used on the inserts they are of the substantially rigid type.

Although rigid non-stick coatings on cooking surfaces, whether on inserts or directly on the primary cooking surfaces, function well when undamaged, they are highly susceptible to scratching by contact with sharp instruments commonly employed by cooks. As recognized, for example, in above noted U.S. Pat. No. 3,934,748 the insert members must be replaced with some frequency. Cooking utensils with the rigid coatings and which do not have a replaceable insert shortly become no better than ordinary uncoated utensils after limited use, and abusive deterioration of the coating.

Sprayon coatings have also been suggested, but they deteriorate rapidly from heating, usage and cleaning.

An important object of the present invention is to overcome the disadvantages, drawbacks, inefficiencies, shortcomings, and problems inherent in prior heated cooking surface coatings or inserts, and to provide a liner which is efficient, inexpensive, easy to use, having the attributes of non-sticking of cooked or cooking materials thereto, easy replaceability, resistance to deterioration, and ready adaptability to heated cooking surfaces without special forming or treatment requirements.

I have discovered that all of the desirable attributes for a successful flexible liner for heated cooking surfaces are present in plastic sheet material having the characteristics presently available in tetrafluoroethylene polymers, commonly referred to as TFE. My discovery contradicts the generally held view that this relatively thick material in flexible sheet form is a thermal insulator in contrast to the thin non-stick rigid or sprayon coatings. Whereas engineering data, concerning the thermal conductivity properties of metals, and non-metallic solids, may indicate TFE to have a thermal conductivity value of only 1.7 Btu/Hr./Ft.$^2$/in./° F. (as compared to 1540 Btu/Hr./Ft.$^2$/in./° F. for type 1100-0 aluminum), I have found that TFE liners, in thicknesses of 0.001 to 0.003 inch have little or no thermal insulating value in flexible liners used on a heated cooking surface. In actual application, such flexible TFE liners approach the thermal conductivity of aluminum. The published engineering data, may be deceptive, since it may have been obtained from testing thicker material samples than films of 0.001 to 0.003 inch which have been found advantageous in accordance with the present invention. I have found that where the sheet material is in direct intimate contact with a heated heat transfer cooking surface there is excellent heat transfer from the heat transfer cooking surface through the liner to the cooking material on the liner.

Excellent results are attained by use on a rigid heat transfer cooking surface of a flexible liner of thin inert plastic sheet material arranged to rest readily separably in covering relation on the cooking surface, the liner being safe against heat damage to a temperature substantially greater than the maximum cooking heat to which the cooking surface may be expected to be raised while the liner is thereon, the liner being nonfusible at cooking heat but being heat softenable to conform intimately to the heated cooking surface especially under a load of cooking material to be subjected to cooking heat so as to transfer heat efficiently from the cooking surface through the liner to the cooking material, and the liner has non-sticking characteristics at least on its surface exposed to the cooking material whereby to avoid sticking of cooking material to said exposed surface and to minimize cleaning efforts.

Although TFE possesses extremely good release properties, some sticking of foods may occur on TFE surfaces, coatings or liners, if such surfaces have been washed several times in strong detergents. To overcome the problem of some food possibly sticking to a coated surface, it has always been recommended by manufacturers that coatings of butter, cooking oil, or any other edible grease-like material be applied to the cooking surface. If for health or diet reasons edible grease-like materials should not be used, and foods do stick to the TFE liner employed according to the present invention, it is recommended that the surface of the liner be scrubbed with a non-metallic scrubbing pad, and rinsed in fresh water before drying. Such cleaning is easily accomplished.

The liner can be removed and cleaned if desired. The liner is especially suitable for omelet pans, facilitating the rolling of cooked omelets, which are a popular egg base food preparation accepted world-wide, and defined by most food experts as scrambled eggs with filling and shape. The basic shapes of omelets are (a) open and flat, (b.) folded in half, (c.) folded more than once, (d.) rolled. Basic omelet ingredients are eggs mixed with water, milk, or cream, and preferred seasonings which are whipped together to form a mixture to be heated and congealed. Fillings vary with preference for taste, ethnic eating habits, as well as the need to use up leftovers. Open and flat omelets are produced generally in round skillets or special round omelet pans featuring liberal radii and fairly steep sides. The problem with the round shape is that it is difficult to deposit the finished omelet on a platter. The omelet because of its great exposed surface tends to cool quickly. Omelets which are folded in half are generally made in the same utensils noted above. The folding which occurs in the pan is generally difficult to accomplish and requires exceptional manual dexterity and skill. Folded omelets can also be made in available clamshell, or hinged type two-section pans, where the omelet mixture is divided into each partitioned section. After the mixture is heated and the filling is placed thereon, one section of the pan is flipped over the other to deposit one omelet section over the other. The problem with this expedient is that the transfer of one half of the omelet over the other is difficult to control, and generally causes spillage of the egg batter, should one prefer omelets with one soft side. In addition, the act of depositing the folded omelet from the remaining filled section of the hinged pan onto the platter creates another crisis operation. Omelets which are folded more than once, are generally prepared in a very large and heavy omelet pan, or on a flat grill surface. One method, when using the large pan which is not popular because of the expertise which is required, involves preheating the pan to approximately 400° F., lubricating it with butter, and pouring in the egg mixture to flash it quickly into a semi-solid form. The filling is then added. To form the omelet into multiple folds, the large heavy pan is vigorously shaken horizontally to allow the cooked egg mixture to gather into an elongated lump, which is then hand formed into a presentable shape, before depositing it on a platter. The problems with this omelet making technique are obvious. Multiple folded omelets, made in restaurants generally are prepared on a flat grill where the liquid egg mixture is allowed to spread unrestricted in a round thin pool. The completed omelet is then folded once and served, or each edge is folded toward the center, and then the omelet is folded once again in the center. Substantial manual dexterity is required to accomplish folding operation. Such omelets because of the method of preparation, and of necessity are very thin, and too well done. Previously, rolled omelets were even more difficult to provide. However rolled omelets offer many advantages over the other described shapes,-a.) the rolled omelets require the least amount of space on a platter, (b.) they lend themselves to carry out service and small packaging, (c.) they retain their heat better and tend to melt and mix their filling more homogeneously, (d.) they are more convenient to consume, (e.) they present an aesthetic and appetizing appearance, (f.) the rolled omelet shape lends itself to improved and practical preparation methods.

As representative of prior attempts at rolling omelets reference is made to U.S. Pat. No. 3,713,380 which requires dual rectangular cooking compartments, and spatulas to accomplish rolling of the egg mixture. Rolled omelets using this appliance, out of necessity are usually thin and with a limited amount of filling in order to make the rolling operation easier. There is also some problem in keeping the rolled shape after discharge from the pan.

Although my liner is especially satisfactory for preparing rolled omelets, the liner is also suitable for flat surface grills, cooking plates, fry pans, deep-fat cooking vessels, stew pots, baking pans and tins, sauce pans, skillets, roasting pans, pressure cookers and the like.

Other objects, features and advantages of the invention will be readily apparent from the following description of certain representative embodiments thereof, taken in conjunction with the accompanying drawings although variations and modifications may be effected without departing from the spirit and scope of the novel concepts embodied in the disclosure and in which:

Figure 1:
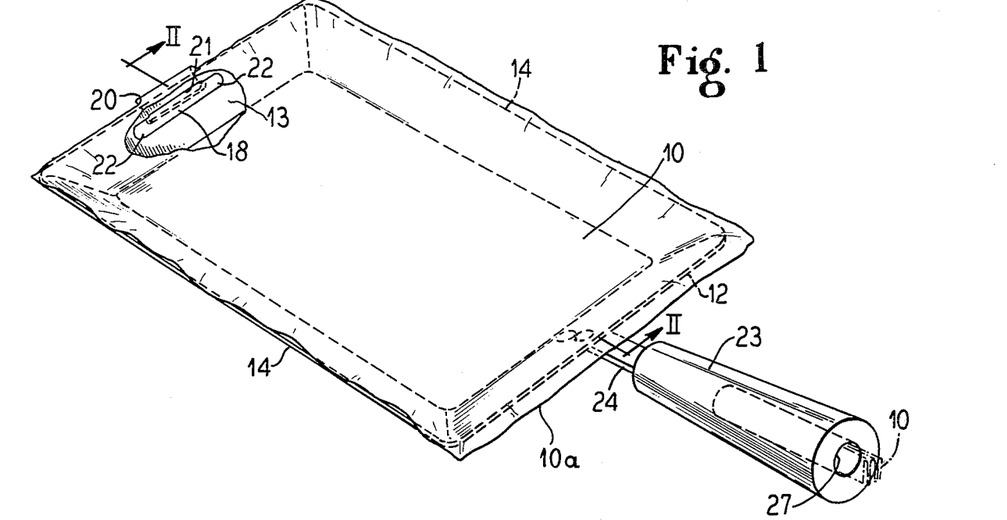
FIG. 1 is a perspective view of a representative cooking utensil having a liner within the principles of the invention, in this instance comprising an omelet pan.
Figure 2:
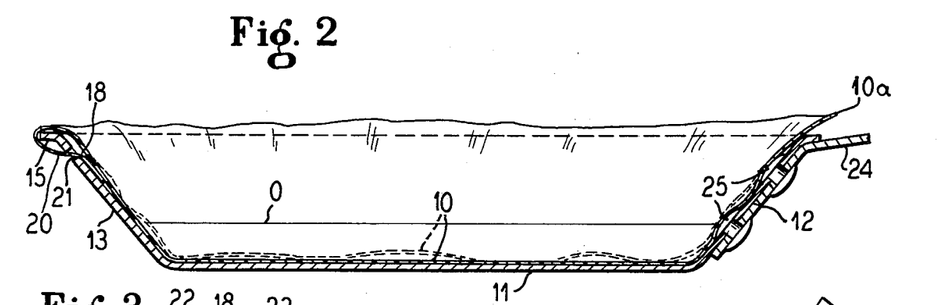
FIG. 2 is an enlarged longitudinal sectional detail view taken substantially along the line II—II of FIG. 1.
Figures 3, 4:
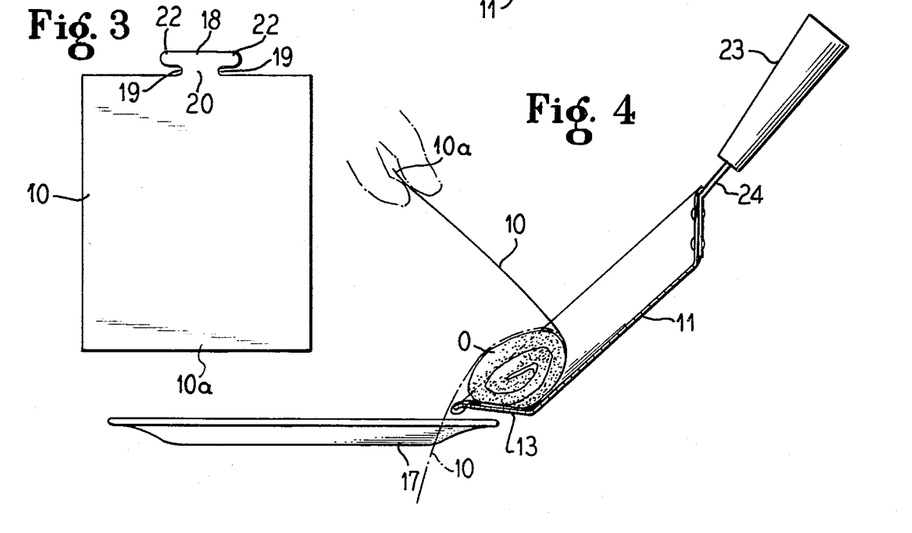
FIG. 3 is a reduced scale plan view of the liner.
FIG. 4 is a schematic illustration of the advantages of the omelet pan in producing a superior rolled omelet.

On reference to FIGS. 1, 2 and 3, a liner 10 is depicted which is especially suitable for use with an omelet pan 11 desirably constructed from a rigid metal such as aluminum, copper clad stainless steel, cast iron or the like providing a heat transfer cooking surface which in normal use has dry heat applied directly thereto for cooking materials lying on said surface and which may be for direct gas or electric stove heating or may be associated with an electrical heating element, as may be preferred. An excellent material for the flexible liner 10 is a thin plastic sheet material having the characteristics of TFE (polytetrafluoroethylene polymer), such as, although not limited to, Teflon. Whatever the plastic sheet material may be, it should be safe against heat damage to a temperature substantially greater than the maximum cooking heat to which the cooking surface may be expected to be raised while the liner is thereon. The liner should be heat softenable to conform intimately to the heated cooking surface especially under a load of material to be subjected to cooking heat, so as to transfer heat efficiently from the cooking surface through the liner to the load of material. Further, the liner should have non-sticking characteristics at least on its surface exposed to the load of material to be cooked, whereby to avoid sticking of cooking material and to minimize cleaning efforts. TFE is excellent for the purpose because it is inert and thus of approved non-toxic nature on exposure to food. It has excellent non-sticking properties. It will tolerate temperatures on the order of 500° F., well above cooking temperatures. It is a thermosoftening plastic material which becomes soft in the presence of heat and stiffens when cooled. In cold state this material resists permanent forming because of its molecular structure so that it has a "memory factor" causing it normally to return to substantially original shape when cold, i.e., ordinary room temperatures. In the production of TFE film or sheet it may be cast or skived and therefore the sheet is generally relatively stress-free so that at raised temperatures it will not distort as much as extruded plastic materials which are highly stressed in production.

As an economy measure, the thickness of the liner 10 should be minimum for the intended service. For most purposes a film thickness of about 0.002 inch will be found satisfactory. For greater strength and durability a film thickness of 0.003 inch may be desirable, but of course that increases the per piece cost. An example of desirability of a 0.003 inch thickness would be where the liner is employed to protect a commercial cooking surface such as a grill maintained heated for long periods and subject to hard usage. I find that whereas the liner will efficiently transfer heat from the heated heat transfer cooking surface, reverse heat transfer from the cooking environment through the liner is lower and therefore at least to some extent resists heat loss. As a result, at termination of a cooking interval where the heat is turned off under a lined cooking utensil, or where such cooking utensil is removed from the heat source, onto a cold surface, the heat of the contents within the vessel will be preserved longer than in a similar unlined vessel.

If the omelet pan 11 were of the round type, the liner 10 would preferably be round complementary to such a round pan. However a more desirable form for the omelet pan 11 is elongate rectangular as shown to facilitate complete omelet rolling, and for that purpose the liner 10 is of similar complementary elongate rectangular form. Dimensionally the liner 10 should be such as to cover not only the bottom surface of the pan 11 but also an upwardly and rearwardly slanting rear wall 12, a similarly upwardly and forwardly slanting forward wall 13 and similar upwardly and outwardly slanting opposite side walls 14. Preferably the pan walls are flared out as much as practical, such as about 30° to 40° from the vertical. Entirely about the upper edges of the pan walls the pan may have a horizontal outwardly projecting lip 15. In such a rectangular omelet path and liner combination numerous advantages over other omelet making utensils and equipment may be mentioned. Rolling of the omelets with soft or liquid-like top or filler surfaces is facilitated. The rectangular shape of the pan produces rectangularly shaped cooked egg mixtures which can be rolled into three or more layers or spirals whereas round omelet pans in a practical sense permit only one fold. Unloading an omelet from the rectangular pan is much easier than from a round pan and requires no additional kitchen tools such as spatulas to assist in the process. Use of the liner permits large and heavy omelets to be rolled easily as contrasted to methods that require using hand manipulative tools. Light gauge pan material may be used providing improved thermal conductivity, reducing heat energy consumption during the cooking process.

Although because of its "memory factor", the cold liner 10 applied to the cold utensil 11 may appear to be generally wavy and somewhat resistant to comformance to the confronting surfaces of the utensil 11, as depicted in full outline in FIG. 1 and in dash outline in FIG. 2, in the presence of heat, and more particularly heat transferred through the utensil to the liner, the flexible liner becomes substantially limp and intimately hugs the surface of the utensil, and more particularly the rigid heat transfer cooking surfaces of the utensil, as shown in full outline in FIG. 2. Cooking material O illustrated in FIG. 2 as placed on the liner will push it down into the pan and toward and into engagement with the cooking surface provided by the bottom of the pan 11.

Means are provided for conveniently indexing the liner 10 relative to the pan 11. For this purpose the front end of the liner is provided with indexing means in the form of a central tab 18 having notches 19 adjacent to its base providing a narrower neck 20 receptive in a complementary slot in the upper portion of the front wall 13 of the pan adjacent to the lip 15. Thus, by aligning the tab 18 with the slot 21 and working the tab through the slot from the front toward the rear, until lateral ears 22 of the tab are inside the pan, a releasable interlock is effected by the tab 18 with the pan front wall 13. When the liner 10 is swung over into position over and within the pan, it will automatically substantiall conform in complementary fashion with the pan and not be skewed to leave any side wall portion of the pan exposed. In other words, the liner will thus provide a complete, uniform liner for all interior surfaces of the pan 11.

As a convenience for handling the pan 11, it is provided with a rearwardly projecting handle 23 which may be formed from wood or suitable plastic material and has a handle adaptor 24 projecting from its forward end and secured as by means of rivets 25 to the rear wall 12 of the pan. In addition to serving as a handle, the handle 23 may be dimensioned to provide a storage receptacle for the liner 10 or for a spare liner. For this purpose the handle 23 is provided with a rearwardly opening bore 27 of suitable diameter and depth to receive the liner 10 in a rolled up or tightly folded condition. Although the storage receptacle bore 27 may be of a length to receive the entire liner 10, it may be slightly shorter than the transverse width of the rolled up liner so that a portion of the liner projects outwardly from the bore substantially as shown in FIG. 1, to facilitate grasping and retrieval of the stored liner.

Assuming that the pan 11 is cold to start with, the pan may be placed on a low temperature heat source. As soon as the heat source heats the pan bottom, the heat gradually heats the bottom and radiates along the bottom to and into the side walls of the pan. Thus that area of the liner 10 which overlies the pan bottom softens initially and pushes out air toward the sides which still being wavy or rumpled in relatively cold state permit the air to escape freely so that by the time the liner has softened in the area overlying the pan bottom and enters into intimate hugging relation to the pan bottom under contents load, air will have effectively been purged from between the liner and the pan surfaces so that efficient heat transfer will be effective through the pan wall and the heat transfer cooking surface thereof and through the liner 10 and into the cooking material on the liner. For example, in preparing an omelet, the beaten omelet material is poured into the pan onto the liner which is clean and dry, or greased, as preferred, to accomplish uniform cooking. Any omelet filling materials may then be placed on the cooked or partially cooked omelet in the pan.

The cooked omelet is then adapted to be conveniently rolled in and from the pan as depicted in FIG. 4 because the liner 10 is loosely removably applied to the pan. Such rolling is easily and efficiently accomplished after removing the pan and its contents from the heat source. By grasping the pan handle 23 with one hand and using the other hand to grasp a rear end portion 10a of the liner nearest the pan handle, and which normally remains cool, and with the pan relatively horizontal, the liner 10 is pulled forwardly at the level of the pan rim until the omelet is trapped between the forward wall 13 and the liner as shown in full line in FIG. 4. The rolled omelet is momentarily held and is slightly squeezed in this position by turning the liner 10 over the omelet and toward the front wall 13, substantially as indicated in dash outline in FIG. 4 which causes the edge of the omelet which is on the outer perimeter of the roll to adhere and bond by cooking to the contiguous omelet surface whereby the omelet is sealed into generally cylindrical shape, virtually seamless. This substantially eliminates unravel or unrolling when the omelet is rolled out of the pan as by tilting the pan forwardly and rolling the omelet into a receptacle such as a plate or platter 17. Thereupon the reusable liner 10 may be returned to its original position in the pan for making of another omelet. If desired, the rear end portion 10a of the liner may be formed to provide a readily engageable handle tab similar to the tab 18.

When rolling out the omelet O, the tab 18 assures that the liner 10 will remain anchored to the front wall 13. By having the tab 18 extending downwardly, it is effectively clamped between the pan wall 13 and the liner 10, especially as the omelet is rolled against the wall 13, thus avoiding any tendency of the liner to slip out of place. This additional retention of the liner 10 is advantageous in effecting the slight squeezing of the omelet after it has been rolled to form a positively sealed product. Thereby excellent control for expeditious rolling of the omelet O is assured. Although only one tab 18 and one slot 21 have been shown, it will be appreciated that two or more sets of slots and tabs may be provided if desired, depending upon the size of the pan and liner. It should be noted that the rectangularly shaped omelet pan 11 with the flared walls is especially advantageous for making and rolling omelets because the TFE liner 10 will form more effeciently than in a pan with substantially vertical sides. The substantially sloping walls of the pan reduce initial waviness or creasing in the cold liner when it is placed in the pan. Upon becoming warm and soft contact with the pan surfaces is facilitated, and resistance to omelet rolling and any tendency of the side edges to fold inwardly are substantially reduced or eliminated. The relatively flat slope of the front wall 13 is especially advantageous in extending the effective length of the pan and thus affording length for rolling the omelet in multiple layers without actually requiring the cooking length of the pan to be appreciably lengthened.

Although the pan 11 as depicted is especially adapted for use over an external heat source such as gas or electric, it is evident that a similar pan arrangement may be designed wherein the pan incorporates its own heating and temperature control system, such as is exemplified by commercially available electric fry pans.

If it is desired to remove the liner 10 from the pan 11, that can be easily effected by disengaging the tab 18 from the pan. Because of the excellent non-sticking nature of the liner 10, the pan and liner combination can be used repeatedly without requiring greasing or cleaning.

Figure 5:
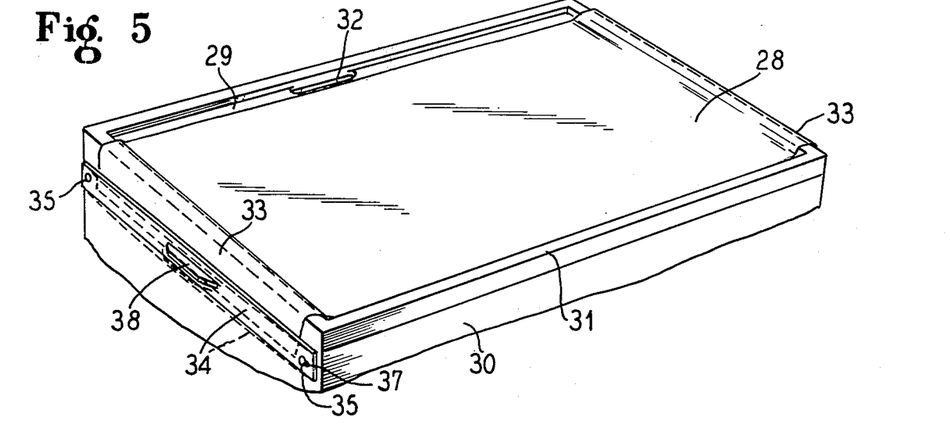
FIG. 5 is a perspective view demonstrating use of a liner in keeping with the principles of the present invention on a flat cooking grill.

Referring to FIG. 5, an arrangement especially suitable for flat solid plate cooking grill surfaces is representatively depicted. Such an arrangement has several advantages among which may be stated that it reduces the weight loss of products being seared, such as hamburger meat and steaks, since it eliminates the common problem of meat sticking to bare hot metallic surfaces, it expedites the removal of the product from the grill since removal is not hampered by a sticking product, it eliminates the labor time consumed normally by the need to scrape hard to remove residue and grease from the bare grill surface after each cooking load, and because of such labor saving features it reduces customer service time which is important especially in fast food service restaurants. For this purpose a flexible liner 28 of thin inert plastic sheet material is of desirable proportions to substantially cover a rigid heat transfer cooking grill surface 29 of whatever preferred dimensions and which may be supported on an adequate frame 30 which also supports a grease retaining rim 31 about the heat transfer grill cooking surface 29. At a suitable place in its margin, such as at the rear, the cooking surface plate 29 may have a grease drain hole 32. Although the liner 28 is desirably of material such as TFE requiring no shortening for any type of cooking thereon, such as pancakes, eggs or any other food to be cooked, certain foods such as bacon, hamburger, and other meats may release substantial quantities of grease and residue during cooking and which it is desirable to drain off through the drain port 32. Besides being able to use TFE liners to manipulate foods such as omelets, the grill liners can be manipulated to guide grease and residue into whatever grill drain facilities are provided.

In a preferred form, the liner 28 comprises a sheet of appropriate size for the grill surface 29 whether of commercial size or smaller domestic size, the liner being dimensioned to substantially cover the cooking plate surface and with one or more ends of the liner extending beyond one or both ends of the grill unit and extending down as retainers against displacement of the liner during use. Although the mere hugging of the opposite ends of the grill unit such as the opposite end portions of the grease curb 31 by depending end portions 33 of the liner 28 may be sufficient, in the limp heated state of the liner, to retain the liner against any substantial displacement in use, retaining means cooperative with one or more of the end portions 33 may be provided. In one desirable form, such retaining means may comprise a retaining clamp 34 at one or both ends of the unit operable to clamp the associated end portion 33 of the liner in place. In one form, the clamp 34 may comprise a flexible metal or heat resistant plastic strip retained in place on the end of the frame 30 as by means of headed pins 35 at each opposite end of the clamping strip. At least one of the pins 35 extends through a longitudinally elongated slot 37 so that by grasping a handle 38 on the strip 34 and pulling outwardly thereon the clamping strip can be flexed away from the adjacent frame surface, as indicated in dash outline, so as to permit ready insertion of the liner end portion 33 between the clamping strip and the confronting surface of the frame 30, whereafter the resilient strip 34 is permitted to snap back to its normal clamping position to hold the liner end portion firmly against displacement until the clamping strip 34 is again resiliently flexed from its clamping engagement. Through this arrangement, the liner 28 is efficiently held in its operating position and when it is desired to remove the liner it can be readily disengaged and removed for cleaning or replacement, as desired. It may be pointed out that the material of the liner 28, such TFE may be of 0.003 inch thickness or heavier depending upon the type of service the liner must accommodate. For example in a commercial grill assembly the liner 28 may be of heavier material then may be needed for a smaller domestic assembly. In a commercial grill assembly the grill plate 29 is generally heated over a more extended time and thus once the liner surface has attained cooking heat, it will remain at that heat as long as the heat source applied to the underside of the grill plate 29 remains active.

Figures 6, 7:
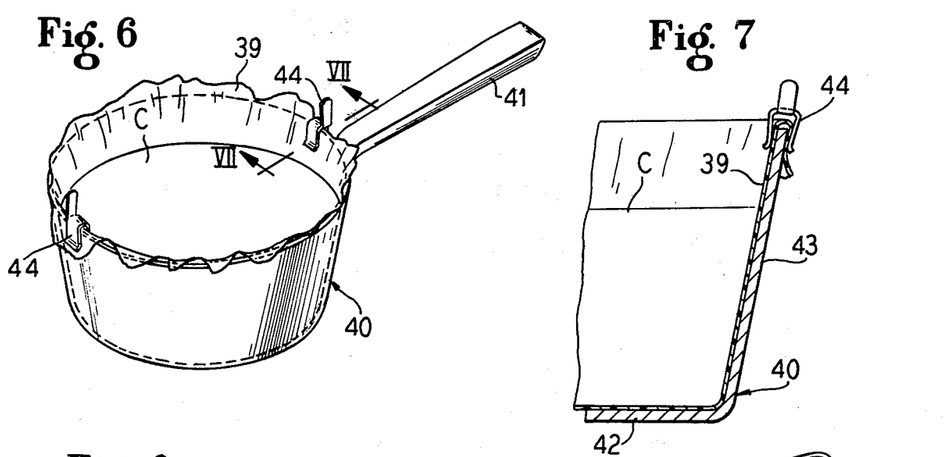
FIG. 6 is a perspective view demonstrating use of a liner within the principles of the present invention in a cooking pot.
FIG. 7 is an enlarged fragmentary sectional detail view taken substantially along the line VII—VII of FIG. 6.

FIGS. 6 and 7 demonstrate use of a flexible liner 39 of thin inert plastic sheet material arranged to rest in readily removable covering relation on a cooking surface in a cooking pot or pan type of appliance 40 which may as is conventional be equipped with a handle 41. For this purpose, the liner 39 is dimensioned to engage in complementary relation within the cooking vessel or pot 40 to cover not only a rigid heat transfer cooking surface bottom wall 42 but also a side wall 43 of the vessel which may be of the round type shown or may be of other geometrical configuration, as preferred. Although as originally placed in cold state in the vessel 40, the liner 39 being made from or having the characteristics of TFE may tend somewhat to return to its originally flat form. Upon heating of the vessel 40, the liner assumes a firmly complementary hugging contact with the inner surfaces defining the bottom wall 42 and the side wall 43, substantially as shown in FIG. 7. In order to attain maximum configuration hugging of the liner 39, it is desirable that initially a substantial contents C be loaded into the lined vessel whereby to press the liner 39 firmly against the opposed surfaces of the vessel as the vessel bottom 42 and the side wall 43 are progressively heated.

In order to hold the liner 39 against skewing during the initial loading and heating steps at least, one or more resilient retaining clips 44 may be applied to the upper margins of the vessel 40 to hold the margins of the liner 39 in place. After the liner is warm and clings to the vessel 43, the clips 44 may be removed if it is desired to cover the vessel with a lid.

Figure 8:
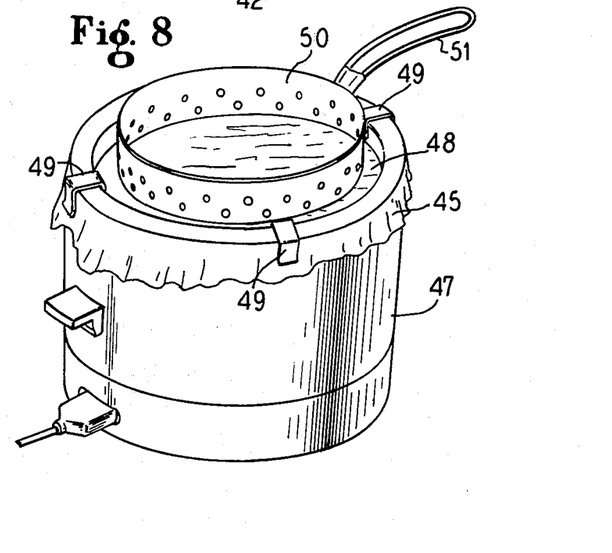
FIG. 8 is a perspective view of a deep fat or blanching pot employing a liner according to the principles of the present invention.

In FIG. 8 a liner 45 of thin inert plastic sheet material such as TFE is used to line the cooking receptacle of a blanching pot or deep fat fryer 47 which may be of the electrically heated or gas heated type, as preferred, and may be of any preferred size for domestic use or for commercial use such as of the size useful for restaurant operations. The liner 45 is dimensioned to cover and snuggly conform to and hug the surfaces within the receptacle of the pot 47, especially while the pot is loaded with a desired heated liquid 48 such as blanching water or deep fat frying oil. The liner 45 may be held removably in place as by means of one or more resilient retaining clips 49 adapted to clamp in margins of the liner onto the upper rim of the pot 47. Food to be blanched or deep fat fried, as the case may be, is adapted to be handled for this purpose in a foraminous receptacle or basket 50 having a handle 51. Since much of the food residue, resulting from foods cooked in deep fat fryers, such as coatings from chicken parts, settle and harden on the bottom of the fryers, flat liners may be used to cover only the bottoms of the fryers, to eliminate the most difficult cleaning chore.

Figure 9:
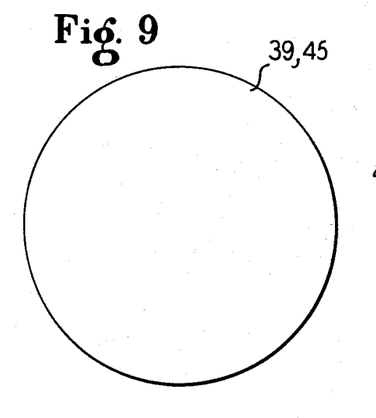
FIG. 9 is a reduced scale plan view of a liner of the type adapted to be employed in the cooking utensils of FIGS. 6 and 8.

For pot or pan type cooking vessels, represented by the vessels 40 and 47, the liner 39,45 may be as shown in FIG. 9 initially of substantially round disk form. It may be noted that even after heat softening and conformance of the liner to the interior surfaces of the associated cooking vessel should the generally upstanding wall hugging portions of the liner remain wrinkled at any point, that is not detrimental because since the heat is applied through the bottom of the vessel, providing the heat transfer cooking surface, the central portion of the liner which engages the heat transfer cooking surface of the bottom of the vessel will assume a flat substantially overall hugging conformance to the heat transfer cooking surface for efficient heat transfer to the cooking material in the vessel whether that be solid, semi-solid or liquid.

Figure 10:
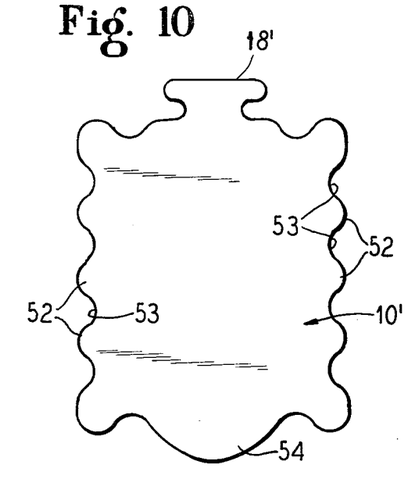
FIG. 10 is a plan view of a liner similar to the liner of FIG. 3, but showing a modification.

On reference to FIG. 10, a liner 10' especially suitable for use with the omelet pan 11 has at least its longitudinal side edges scalloped in undulating fashion substantially as shown providing alternate projections 52 and recesses 53 which improves the conformance of the sides of the liner to the sides of the pan and also reduces resistance to omelet rolling maneuver of the liner. At its front end the liner 10' has a locking tab 18' of substantially the same structure as the locking tab 18 of the liner 10, and intended for the same purpose. At its rear end, the liner 10' is desirably provided with a central finger tab extension 54 which will facilitate grasping of the rear end of the liner for executing the omelet rolling maneuver.

Figure 11:
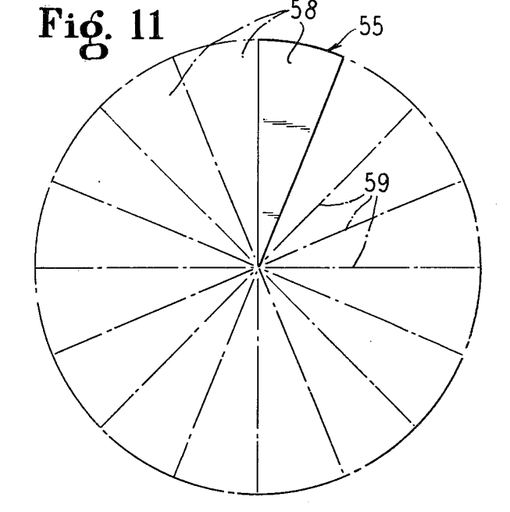
FIG. 11 is a plan view of a folded circular liner.
Figures 12, 14:
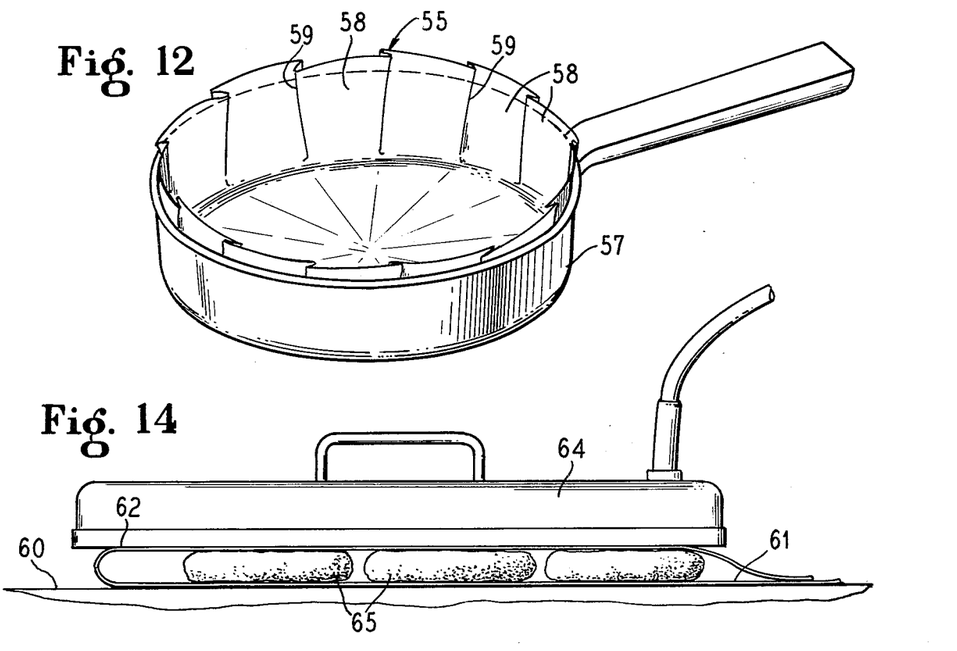
FIG. 12 is a perspective view of a skillet employing the liner of FIG. 11.
FIG. 14 is a similar schematic illustration showing the use of a heated meat press on the folded over liner.

In FIGS. 11 and 12 is shown a liner 55 of flexible thin inert plastic sheet material, within the principles of the present invention, especially suitable for use with cooking vessels of substantially round form and having steep side walls such as a fry pan 57, which has a relatively large diameter relative to upright wall height. Usefulness of the liner 55 in deeper cooking vessels such as the vessel 40 in FIGS. 6 and 7 of the stew pan type is also indicated. In order to facilitate packaging, and also to facilitate cold placement of the liner 55 in a cooking vessel, the liner is desirably folded upon itself from its essentially circular disk flat unfolded form. This can be readily accomplished by folding the disk along its diameter upon itself into a generally open fan shape semicircular form, then folding upon itself into partially open fan shape or quarter disk form. Folding is continued by successively folding the quarter disk upon itself into eighth disk, and so on, depending upon the diameter of the original disk for example until a sixteenth disk form is achieved as shown in FIG. 11, wherein the disk is now folded into sixteen pie shaped panels 58 connected along hinge fold lines 59. In the fully folded packet, it will be observed that the liner 55 can be easily packed or stored in minimum space. This is advantageous for sales purposes because the folded liner can be packaged in convenient hang-up packages for retail store sale displays, as is currently popular sales technique. Furthermore, when the liner 55 is spread open for use, the hinge creases along the lines 59 facilitate placement of the liner 55 in the chosen cooking vessel such as the pan 57 wherein the central portion of the liner readily accommodates to the flat bottom surface of the cooking vessel and because of the hinge creases 59 the margin of the liner more readily accommodates itself to the upstanding wall of the vessel. Upon heating, and softening of the liner 50 so that it turns limp in the vessel 57 the hinge creases tend to assist in orienting the marginal portion of the liner in a reasonably patterned manner for superior hugging of the upstanding wall even though cooking contents may not press uniformly against the liner.

Figure 13:
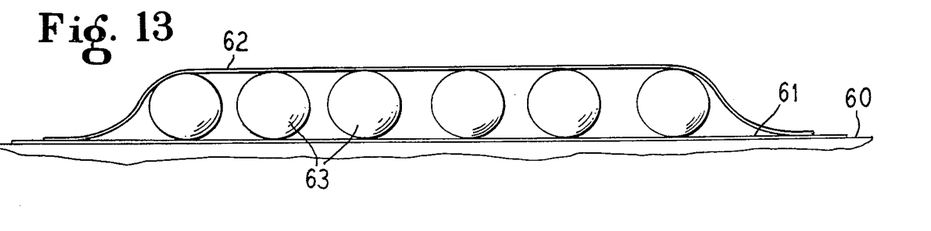
FIG. 13 is a schematic illustration of a lay-over liner used on a cooking grill.

Improved results can be obtained in cooking on a horizontal cooking surface 60 as shown in FIGS. 13 and 14 by placing the food to be cooked between two layers 61 and 62 of flexible liner of thin inert plastic sheet material having characteristics within the principles of the present invention. While, as shown in FIG. 13 the bottom or heated cooking surface engaging liner 61 and the overlying liner 62 may be separate sheets, they may both be part of a common connected folded-over sheet as shown in FIG. 14. The top liner 62 has at least the function of retaining heat in the food and thus substantially accelerating the cooking process and may be found especially suitable for rapid heating of sausages 63 (FIG. 13), potatoes, and the like where both sides of the food need not be browned. Where both sides of the food need browning, the food may be seared and then the final cooking effected with the superimposed liner 62 in place. On the other hand, where the grill is equipped with a hinged heated cooking element such as in an electrically heated hinged grill, the upper hinge portion may be applied to the top of the upper liner 62 substantially in the manner shown in FIG. 14 which, however, depicts a separate heated meat press 64 applied to the top liner where the grill 60 is not equipped with a hinged cooking top. This sort of arrangement is especially suitable for cooking flat meat products 65 such as hamburger, steak and the like and accomplishes cooking substantially equally on the bottom and top of the food product and in a fraction of the time necessary where all the cooking is effected from the bottom, requiring turning of the food product in order to cook both sides. By virtue of the interposed liners 61, 62 between both the lower cooking surface and the upper cooking surface, both of the cooking surfaces are maintained free and clean of any adherent food, thus maintaining the surfaces substantially clean and greatly reducing sanitation problems, especially in restaurant operations.

Numerous advantages are inherent in the use of a separable flexible line pursuant to the principles of the present invention, not the least of which is that the liner can be easily and relatively inexpensively replaced if damaged, in contrast with cooking surfaces which are coated with a non-stick bonded coating. The liners of the present invention are more resistant to deterioration and damage because they are flexible and generally two to three times, at least, thicker than the bonded coatings which are generally much thinner and are fixed and hard. Once a bonded coating is applied, the easy cleaning and non-stick properties are dependent upon the continued unbroken condition of the coating. In use, however, especially in commercial operations, bonded non-stick coatings deteriorate prematurely generally due to abusive cleaning with abrasive materials, gouging or abrading due to contact with hard or sharp kitchen tools or cleaning implements, careless exposure to higher than necessary temperatures, and the like. Once the bonded coatings are damaged, they loose the non-sticking easy to clean advantages, generally at appreciable cost and inconvenience, and either the appliance must be recoated or replaced at some expense and inconvenience. The separable liner of the present invention is less susceptible to serious damage, and is easier to clean than an appliance with a coated surface. The use of abrasive cleaning materials on the film or sheet liner of the present invention is not particularly destructive, and in fact may be encouraged to prolong the useful life of the liner, in contrast to the destructive results of using abrasive cleaning agents on the bonded coatings. The substantially thicker flexible liners according to the present invention are substantially less susceptible to damage from kitchen tools than the much thinner, solid anti-stick bonded coatings. Substantially all existing cooking appliances having heated cooking surfaces can be readily supplied with liners pursuant to the present invention. Liners within the principles of the present invention are also an important adjunct where leakproof containment is necessary in a cooking process but cannot always be provided by the supporting appliance or frame. The liner can also be used to form dividing walls within a pan requiring such a separating feature.

The liner may also be used to line containers which are used to store hot foods and where food sticking has heretofore been a problem. By also covering hot foods or foods in the process of being cooked by such a liner or an extension of the liner being used on the cooking surface heat loss is substantially reduced and cooking time substantially accelerated.

Where the bonded anti-stick surfaces of existing appliances have deteriorated, continued anti-stick easy cleaning use of the appliances can be continued by supplying the same with a liner within the principles of the present invention. Whereas solid anti-stick bonded surfaces are almost always applied to aluminum cookware, the TFE liners of the present invention can be applied to cookware of any material, such as stainless steel, cast iron, ceramic, etc. Liners according to the present invention can be made readily available as original equipment or as replacements economically available through wholesale and retail establishments.

Actual test results have demonstrated that the heat transfer rate is practically identical through similar aluminum pans which are bare metal, or provided with bonded coatings, or which are equipped with removable liners pursuant to the present invention. Heat transfer rates are practically identical through pans which are constructed with stainless steel, stainless steel with copper or aluminum clad bottoms or cast iron, with or without the TFE liners pursuant to the present invention. That is, the thermal conductivity in each instance is substantially the same. In repeated tests it has been found that a cooking utensil equipped with a liner film or sheet in accordance with the present invention permits water and solid foods to heat up almost as quickly as if in or on a bare surface cooking utensil. The speed at which the liner can transmit heat is attested to by the fact that meat surfaces can be seared on the lined surfaces without noticeable loss of time. It has been found that the interior portions of meat can be heated to the same degree in almost the same time on flexible non-stick film lined surfaces according to the present invention as by use of bare cooking surfaces. In fact, tests show that the film covered surfaces according to the present invention are virtually as good heat transmitters as most metal surfaces to which the film liner may be applied. The close adherence of the thin flexible liner to the rigid heat transfer surface greatly reduces the temperature gradient across the surfaces, attaining the efficient heat transfer to the cooking material in or on the cooking surface of the appliance. Advantageously, pinholes or small punctures in the flexible liner do not detract from usefulness of the liner and close reasonably tightly when the liner heats in use.

It will be understood that variations and modifications may be effected without departing from the spirit and scope of the novel concepts of this invention.

I claim as my invention:

1. In combination with a rigid heat transfer cooking surface which in normal use has dry heat applied directly thereto for cooking material lying on said surface:

a flexible liner of thin inert plastic sheet material made of TFE and resting readily separably in covering relation on said cooking surface under the material to be cooked;

said liner being of about 0.001 to 0.003 inch in thickness;

said liner being safe against heat damage to a temperature substantially greater than the maximum cooking heat to which said cooking surface may be expected to be raised while the liner is thereon;

said liner being nonfusible at cooking heat but being heat softenable to conform intimately and in automatic air purging engagement with the heated cooking surface especially under a load of the material to be subjected to cooking heat so that heat is transferred efficiently from said cooking surface through the liner to the cooking material;

and said liner having non-sticking characteristics at least on its surface exposed to the cooking material whereby to avoid sticking of cooking material to said exposed surface and to minimize cleaning efforts.

2. A liner according to claim 1, having an indented generally undulating edge to facilitate conformance of the edge with side wall of an associated cooking vessel.

3. A combination according to claim 1, said liner being of substantially circular disk form and foldable upon itself along radial lines and by substantially triangular segments between the lines into a substantially triangular packet for storage and cold handling convenience.

4. For use in combination with a rigid heat transfer cooking surface:

a flexible liner of thin inert plastic sheet material made of TFE arranged to rest readily separably in covering relation on said cooking surface; said liner being of about 0.001 to 0.003 inch of thickness;

said liner being safe against heat damage to a temperature substantially greater than the maximum cooking heat to which said cooking surface may be expected to be raised while the liner is thereon;

said liner being nonfusible at cooking heat but being heat softenable to conform intimately to the heated cooking surface especially under a load of cooking material to be subjected to cooking heat so as to transfer heat efficiently from said cooking surface through the liner to the cooking material;

said liner having non-sticking characteristics at least on its surface exposed to the cooking material whereby to avoid sticking of cooking material to said exposed surface and to minimize cleaning efforts;

and integral indexing means on and projecting from one edge of said liner in the form of a tab notched at its base whereby to provide a narrow neck receptive in a complementary slot in a wall associated with the cooking surface whereby the liner will be held in desired position on the cooking surface.

5. For use in combination with a rigid heat transfer cooking surface:

a flexible liner of thin inert plastic sheet material made of TFE arranged to rest readily separably in covering relation on said cooking surface; said liner being of about 0.001 to 0.003 inch of thickness;

said liner being safe against heat damage to a temperature substantially greater than the maximum cooking heat to which said cooking surface may be expected to be raised while the liner is thereon;

said liner being nonfusible at cooking heat but being heat softenable to conform intimately to the heated cooking surface especially under a load of cooking material to be subjected to cooking heat so as to transfer heat efficiently from said cooking surface through the liner to the cooking material;

said liner having non-sticking characteristics at least on its surface exposed to the cooking material whereby to avoid sticking of cooking material to said exposed surface and to minimize cleaning efforts;

said liner being of substantially circular disk form and folded upon itself along radial lines and by substantially triangular segments between the lines into a substantially triangular packet for storage and cold handling convenience, and from which packet the liner is adapted to be spread open for placement on the cooking surface, the liner having fold creases which smooth out when the liner is softened by cooking heat whereupon the liner conforms intimately to the heated cooking surface.

6. In combination with a rigid heat transfer cooking surface:

a flexible liner of thin inert plastic sheet material made of TFE resting readily separably in covering relation on said cooking surface; said liner being of about 0.001 to 0.003 inch of thickness;

said liner being safe against heat damage to a temperature substantially greater than the maximum cooking heat to which said cooking surface may be expected to be raised while the liner is thereon;

said liner being nonfusible at cooking heat but being heat softenable to conform intimately to the heated cooking surface especially under a load of cooking material to be subjected to cooking heat so as to transfer heat efficiently from said cooking surface through the liner to the cooking material;

said liner having non-sticking characteristics at least on its surface exposed to the cooking material whereby to avoid sticking of cooking material and said exposed surface and to minimize cleaning efforts;

said cooking surface comprising a utensil having a handle;

and said handle having a chamber therein for rolled-up storage of the liner.

7. In combination with a rigid heat transfer cooking surface:

a flexible liner of thin inert plastic sheet material made of TFE resting readily separably in covering relation on said cooking surface; said liner being of about 0.001 to 0.003 inch of thickness;

said liner being safe against heat damage to a temperature substantially greater than the maximum cooking heat to which said cooking surface may be expected to be raised while the liner is thereon;

said liner being nonfusible at cooking heat but being heat softenable to conform intimately to the heated cooking surface especially under a load of cooking material to be subjected to cooking heat so as to transfer heat efficiently from said cooking surface through the liner to the cooking material;

said liner having non-sticking characteristics at least on its surface exposed to the cooking material whereby to avoid sticking of cooking material to said exposed surface and to minimize cleaning efforts;

said cooking surface comprising a cooking utensil having a generally upstanding wall;

said liner having an anchoring tab structure;

and a slot in said utensil wall within which the tab structure is interlockingly engageable.

8. In combination with a rigid heat transfer cooking surface:

a flexible liner of thin inert plastic sheet material made of TFE resting readily separably in covering relation on said cooking surface; said liner being of about 0.001 to 0.003 inch of thickness;

said liner being safe against heat damage to a temperature substantially greater than the maximum cooking heat to which said cooking surface may be expected to be raised while the liner is thereon;

said liner being nonfusible at cooking heat but being heat softenable to conform intimately to the heated cooking surface especially under a load of cooking material to be subjected to cooking heat so as to transfer heat efficiently from said cooking surface through the liner to the cooking material;

said liner having non-sticking characteristics at least on its surface exposed to the cooking material whereby to avoid sticking of cooking material to said exposed surface and to minimize cleaning efforts;

said surface comprising a generally rectangular omelet pan having a handle at one end and a slanting ramp-like wall at its opposite end;

said liner being dimensioned to cover at least the bottom of said pan and said end wall and having an end portion projecting toward said handle to facilitate manipulating the liner for omelet preparation;

said liner being adapted to be grasped at said end portion for pulling the liner toward said end wall for rolling a cooked omelet;

and said end wall and said liner being cooperative at termination of the rolling to effect sealing of the omelet by squeezing the omelet toward said end wall by manipulation of the liner.

9. A combination according to claim 8, wherein said end wall has a slot therein, and said liner has an interlock tab secured in said slot to anchor the liner or facilitating manipulation of the liner relative to the pan.

10. In combination with a rigid heat transfer cooking surface:

a flexible liner of thin inert plastic sheet material made of TFE resting readily separably in covering relation on said cooking surface; said liner being of about 0.001 to 0.003 inch of thickness;

said liner being safe against heat damage to a temperature substantially greater than the maximum cooking heat to which said cooking surface may be expected to be raised while the liner is thereon;

said liner being nonfusible at cooking heat but being heat softenable to conform intimately to the heated cooking surface especially under a load of cooking material to be subjected to cooking heat so as to transfer heat efficiently from said cooking surface through the liner to the cooking material;

said liner having non-sticking characteristics at least on its surface exposed to the cooking material whereby to avoid sticking of cooking material to said exposed surface and to minimize cleaning efforts;

and a second liner superimposed on food lying on said first-mentioned liner.

11. A combination according to claim 10, including a heated cooking surface superimposed on said liner which is superimposed upon the food.

* * * * *